United States Patent
Obermöller et al.

(10) Patent No.: US 10,941,874 B2
(45) Date of Patent: Mar. 9, 2021

(54) VALVE ACTUATING DRIVE

(71) Applicant: KARL DUNGS GMBH & CO. KG, Urbach (DE)

(72) Inventors: Nils Obermöller, Schorndorf (DE); Dominic Marx, Plüderhausen (DE); Benjamin Bös, Schorndorf (DE)

(73) Assignee: KARL DUNGS GMBH & CO. KG, Urbach (DE)

( * ) Notice: Subject to any disclaimer, the term of this patent is extended or adjusted under 35 U.S.C. 154(b) by 247 days.

(21) Appl. No.: 16/084,070

(22) PCT Filed: Mar. 11, 2016

(86) PCT No.: PCT/EP2016/055364
§ 371 (c)(1),
(2) Date: Sep. 11, 2018

(87) PCT Pub. No.: WO2017/153001
PCT Pub. Date: Sep. 14, 2017

(65) Prior Publication Data
US 2020/0300376 A1    Sep. 24, 2020

(51) Int. Cl.
*F16K 31/04* (2006.01)
*H02P 8/32* (2006.01)

(52) U.S. Cl.
CPC .......... *F16K 31/047* (2013.01); *F16K 31/046* (2013.01); *H02P 8/32* (2013.01)

(58) Field of Classification Search
CPC ......... F16K 31/046; F16K 31/047; H02P 8/32
(Continued)

(56) References Cited

U.S. PATENT DOCUMENTS

| 3,685,790 | A | * | 8/1972 | Crowe | .................. F16K 31/047 |
| | | | | | 251/67 |
| 5,040,569 | A | * | 8/1991 | Nogami | .................. B21B 37/62 |
| | | | | | 137/625.21 |

(Continued)

FOREIGN PATENT DOCUMENTS

| CL | 201802586 | 9/2018 |
| CL | 201802588 | 9/2018 |

(Continued)

OTHER PUBLICATIONS

Japanese Notice of Reasons for Refusal dated Oct. 21, 2019, in corresponding Japanese Patent Application No. 2018-566628, with English translation (17 pages).

(Continued)

*Primary Examiner* — Matthew W Jellett
(74) *Attorney, Agent, or Firm* — Fitch, Even, Tabin & Flannery LLP

(57) ABSTRACT

A valve actuator (10) has a damping circuitry including a capacitive damping circuit (37), which is activated in the event of generator operation of the stepper motor (18). The damping circuitry, together with the motor winding (26), forms a resonance assembly LCR, which has the effect of stabilising and regulating rotational speed. The rotational speed of the stepper motor (18), running in generator operation, is held constant within limits, specifically without the control intervention of control circuitry. Therefore, the damping circuitry can operate even in the currentless state of the control system and is reliable regardless of external current supply. Fast closing is achieved, and excessively long post-running of the motor (18) is reliably prevented.

14 Claims, 1 Drawing Sheet

(58) Field of Classification Search
   USPC .................................. 251/129.11–129.13
   See application file for complete search history.

(56) References Cited

U.S. PATENT DOCUMENTS

| | | |
|---|---|---|
| 6,040,676 A | 3/2000 | Nordquist et al. |
| 6,050,676 A | 4/2000 | Sugimoto et al. |
| 6,100,655 A | 8/2000 | McIntosh |
| 6,184,604 B1 | 2/2001 | Takano et al. |
| 2008/0116835 A1 | 5/2008 | Tsui et al. |
| 2013/0076276 A1 | 3/2013 | Huwiler |

FOREIGN PATENT DOCUMENTS

| | | |
|---|---|---|
| DE | 3531262 A1 | 3/1987 |
| DE | 10248616 A1 | 5/2004 |
| DE | 102011103135 A1 | 11/2012 |
| EP | 2228573 A1 | 9/2010 |
| EP | 2573640 A1 | 3/2013 |
| EP | 2228573 B1 | 11/2013 |
| EP | 3427378 A1 | 1/2019 |
| JP | S60-106393 A | 6/1985 |
| JP | H10-164878 A | 6/1998 |
| RU | 135383 U1 | 12/2013 |
| WO | 2017153001 A1 | 9/2017 |

OTHER PUBLICATIONS

International Search Report dated Nov. 16, 2016, for corresponding PCT Application No. PCT/EP2016/055364 (13 pgs.).

Russian Decision to Grant dated Apr. 21, 2020, in corresponding Russian Application No. 2018134790/07(057287), with machine English translation (20 pages).

Chilean Office Action dated Dec. 10, 2019, in corresponding Chilean Patent Application No. 201802587, with English translation (19 pages).

* cited by examiner

VALVE ACTUATING DRIVE

CROSS REFERENCE TO RELATED APPLICATIONS

This patent application is the national phase of PCT/EP2016/055364, filed Mar. 11, 2016.

TECHNICAL FIELD

The invention relates to a valve actuator for valves, stopcocks, gates or dampers with a self-closing function.

BACKGROUND

In order to actuate fluid valves, gates, dampers and the like, electric drives are known for example from DE 102 48 616 A1, in which the actuating movement of the valve closure member is produced by an electric motor. There, a closing spring is provided, which closes the valve in the event of a power failure. The closing force of the closing spring is of such a magnitude that it overcomes the deceleration torques produced by friction and other influences in the motor and gearing and transfers the valve closure member into the closed position when the motor is in the currentless state. In the case of gas applications, this process should usually be completed within a limited period of time, for example approximately 1 second. On the other hand, overloading of the valve seat and of the valve closure member during the closing process must be reliably prevented, because this overloading can lead to damage of the valve and therefore to a lack of functionality. The kinetic energy that acts as the valve closure member contacts the valve seat must therefore be limited.

To this end, an electromotive valve actuator is known from EP 2 228 573 B1, in which the gearing contains a chain, via which the valve closure member is pulled into the open position against the force of a closing spring. The chain conveys pull forces, but not push forces to the valve closure member, and it therefore, during the dynamic closing process, separates the motor-gearing unit, which is in the process of slowing down, from the closure member contacting the valve seat. The functionality of this principle is provided at any rate if the motor of the actuator does not experience excessively long post-running. This means that the force of the closing spring and the length of the chain have to be coordinated with one another. Should identical valve actuators be used on various valves having different closing forces, this principle has its limits. Should there be excessive post-running, there is always a tolerance that has to be compensated for in order to be ready for the next opening process. If requirements are placed on the availability time, the sole use of an overrun therefore is not expedient.

Furthermore, a simple short-circuit assembly for braking permanently excited brushless DC motors is known from DE 35 31 262 A1. The brushless DC motor is connected via a switchover relay either to a direct voltage source or to a short-circuit branch. If the damping circuitry is activated, the brushless DC motor post-running in generator operation is short-circuited, such that its kinetic energy is converted into heat in the technically necessary ohmic resistor of the motor and the short-circuit assembly. The motor stops abruptly.

The object of the invention is to create a valve actuator which can be used on valves or dampers of varying size and which provides reliable self-closing.

SUMMARY

The valve actuator according to the invention comprises a permanently excited stepper motor with typically two or more windings, which each have a certain inductance and a certain ohmic resistance. The valve actuator also includes a gearing, via which the stepper motor can be connected in terms of drive to the valve closure member so as to move this closure member away from a valve seat in an opening direction and towards the valve seat in a closing direction. In order to implement an automatic self-closing function, a spring means is provided. This is connected directly or indirectly to the gearing in order to preload the connected valve closure member in the closing direction and move it in the closing direction in the event of a power failure.

The winding of the motor is connected to a feed circuitry, which can move the motor in a controlled manner in the opening direction, overcoming the force of the closing spring, and can hold said motor in predefined positions. In addition, a damping circuitry is provided which comprises a capacitive damping circuit. This capacitive damping circuit is designed to decelerate the motor running in generator operation (during the closing movement), in a speed-dependent manner. In order to be able to switch over between drive and damping, a switchover device is provided. This connects either the feed circuitry or the damping circuitry to the winding. The switchover is preferably performed at a time at which it is not energised. The switchover in the currentless state can be implemented by the control device, which controls or adjusts the motor current.

The capacitive damping circuit together with the inductance of the winding of the stepper motor during damping operation forms a resonance assembly, which is excited by the rotating rotor running in generator operation. The resultant current acts in a damping manner on the rotation of the rotor. The damping effect is dependent non-linearly on the rotor speed and increases overproportionally as said speed rises. The damping circuitry thus ensures independently, without external control intervention, that the motor speed during the closing process is dependent only to a very small extent on the force of the closing spring, such that on the one hand a speed that is not too great is provided and therefore not too much kinetic energy is provided in the motor and gearing, and on the other hand fast closing can be achieved reliably.

Each of the windings of the stepper motor is preferably connected in the aforesaid way via a switchover device to a feed circuitry and for damping to a damping circuitry with capacitive damping circuit. All windings of the stepper motor are therefore preferably used for damping. The desired damping can be adjusted with the number of the loaded phases.

The switchover devices are preferably operated synchronously, i.e. either all windings are connected to their feed circuitries or all windings are connected to their damping circuitries. The switchover devices are preferably those with mechanical contact, for example a switchover relay. The normally closed contact of the switchover relay in question preferably leads to the damping circuit, whereas the normally open contact leads to the feed circuitry. As soon as the switchover relay is currentless, i.e. drops out, the damping circuitry is activated. The damping circuitry is thus reliably active in the event of a power failure.

The capacitive damping circuit preferably contains a capacitor, which via the switchover device forms a loop with the winding of the stepper motor, which loop is a resonance circuit. The ohmic resistance of the winding and iron losses of the iron circuit of the stepper motor constitute a damping of this resonance circuit and determine the quality factor thereof. The quality factor is preferably such that it is at least greater than five, preferably greater than ten, and more preferably greater than twenty. A relatively steep resonance curve of the resonance arrangement is thus achieved, which in turn results in a heavily non-linear deceleration torque-speed characteristic curve of the motor. A heavily non-linear characteristic curve of this kind leads to a well-defined motor speed during the damping process.

The damping device and the spring means are preferably dimensioned and coordinated with one another in such a way that the motor speed during the closing process is five to fifteen times, preferably ten times the speed when opening the valve. The damping device can be designed on the basis of the energy remaining in the system once the valve has been closed, said energy being dependent on the quick-closing speed. This energy drives the motor and the gearing in the slowing-down phase once the valve closure member has been placed against the valve seat. Should the slowing down be limited in order to minimise the availability time for the next opening process, an end stop can be provided for the valve-side gearing output. The impact of the gearing output against the end stop has a pulse, the height of which is preferably such that the gearing does not experience any loading, there also being a lack of loading in normal operation. On the other hand, the closing speed and therefore the motor speed is it least so high that the maximum closing time in view of the closing path is in any case undershot.

The coordination relates here fundamentally to the configuration of the damping device. The choice of the spring means and the magnitude of the spring force thereof are relatively uncritical. The valve actuator can therefore be used readily for various closing springs, without requiring adaptation or modification. The closing speed is preferably set by the size of the capacitor in the capacitive damping circuit.

In order to keep the kinetic energy, present in the motor and gearing in spite of the motor running in a damped manner, away from the valve closure member and the valve seat as the valve closure member is placed against the seat, a gearless unit can be provided between the gearing and the valve closure member. This gearless unit is preferably formed by a flexible tension means, for example a chain. The damping circuitry brings about a merely short slowing down of motor and gearing, which can be limited to a fraction of a full revolution of a chain wheel for the chain. In this way, it is possible to work with short chains and short slowing-down zones, whereby the size of the valve actuator can be reduced to a minimum.

In accordance with the invention a method for operating a valve actuator is additionally provided. The particular feature of the method lies in particular in the damping of the stepper motor of the valve actuator by means of a damping circuitry with resonance characteristic. The resonance arrangement formed of motor winding and capacitive damping circuit operates during the damping preferably in sub-resonant operation, i.e. the frequency of the generated current lies below the resonance frequency of the resonance arrangement. In this way, a heavily non-linear deceleration torque-speed characteristic curve is achieved, with which the deceleration torque rises very significantly overproportionally with rising speed.

BRIEF DESCRIPTION OF THE DRAWINGS

Details of embodiments of the invention are the subject of the drawings, the description, or dependent claims. In the drawings:

DETAILED DESCRIPTION

Figure 1:
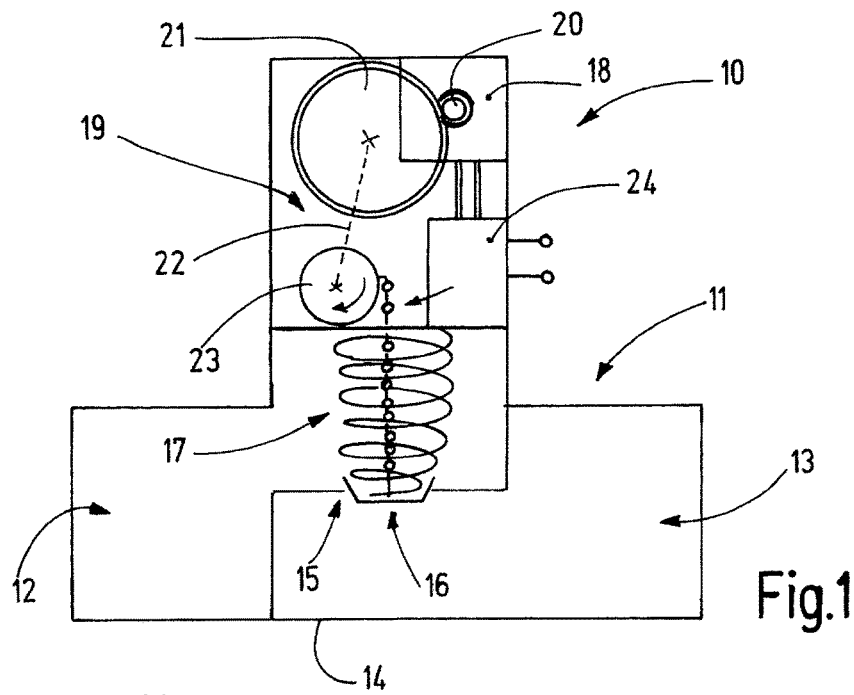
FIG. 1 shows a valve actuator with connected valve, in a very heavily schematised overview.

FIG. 1 shows a valve actuator 10, which is intended for actuation of a valve 11, by means of which a gas stream entering at its input 12 and exiting at its output 13 can be enabled, blocked or also adjusted. To this end, a valve seat 15 is arranged in the valve housing 14 and is paired with a valve closure member 16. The valve closure member is arranged movably so as to be able to close or release the valve seat 15 as necessary. In the exemplary embodiment according to FIG. 1 the valve closure member moves parallel to the opening axis of the valve seat 15—the valve is a poppet valve. The valve actuator 10, however, can be used equally in other valve types, which are referred to as gates, dampers or the like and in which the closure member for example is moved at a right angle to an opening axis of an opening.

The valve closure member 16 is paired with a closing spring 17, which preloads the valve closure member 16 in the closing direction, i.e. towards the valve seat 15.

The valve actuator 10 includes a permanently excited stepper motor 18, which is connected via a gearing 19 to the valve closure member 16. The gearing 19 is a reduction gearing which has at least one gearwheel 21 meshing with a motor pinion 20. Further gearwheels meshing with one another can be connected, said gearwheels forming a force transmission path. This is indicated purely schematically in FIG. 1 by a dashed line. The force-transmission path can comprise rotating gearing elements and in particular also linearly movable gearing elements, for example gear racks, threaded spindles or, as shown by way of example in FIG. 1, a flexible tension means, such as a chain 22. This is connected at one end to a chain wheel 23 and at its other end to the valve closure member 16. Instead of a chain, other elements could also be used, however, such as flexible wires, cables, belts or the like.

The chain 22 forms a connection that has high tensile strength, but low shear strength and allows movement of the chain wheel 23 in a push direction, without movement of the valve closure member 16. It thus forms a gearless unit. Instead of a flexible tension means, the gearless unit can also be formed by a connection, with play, of two gearing members, such as a driver sitting in a slot.

Figure 2:
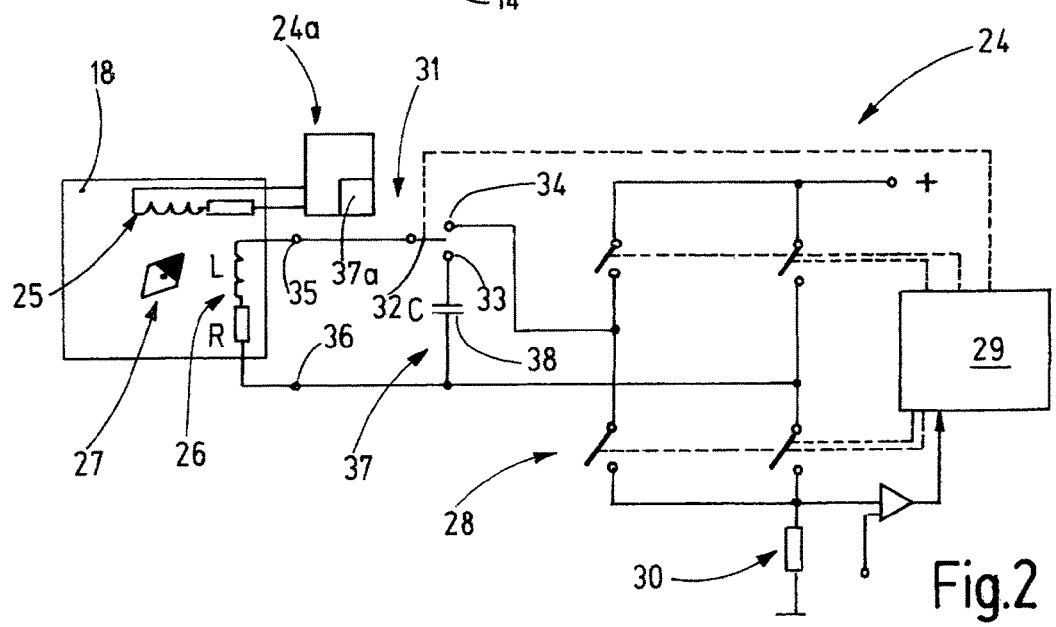
FIG. 2 shows the valve actuator, in a schematised and simplified circuit diagram.

The stepper motor 18 is connected to an operating circuitry 24, which is shown in part in FIG. 2. As can be seen, the stepper motor 18 typically has a plurality of windings, for example two windings 25, 26, which are used to construct a rotary field for rotation of the permanently excited rotor 27. To this end, a feed circuitry 28 is provided for each winding 25, 26 and is shown in FIG. 2 merely by way of example and representatively for all feed circuitries for the winding 26. The feed circuitry 28 is used to provide a controlled, variable current for the winding 26 in order to excite said winding in phase with the other windings 25 and to establish a field which determines the movement or also the position of the rotor 27. To this end, the feed circuitry 28 for example comprises a switch bridge 29 with four electronically controlled switches, for example MOSFET transistors, IGBTs or the like, which are operated in a manner controlled by a control circuitry 29. This control circuit can also detect and adjust the current flowing in the winding 26 via a current sensor arrangement 30. The control circuitry 29 can also control the inverter bridges (not shown in further detail) for the other winding and can control and/or adjust the current of said winding.

The current delivered from the inverter bridge is fed to the stepper motor 18 via a switchover device 31 controlled for example by the control device 29. This switchover device is formed for example by a switchover relay, the tongue 32 of which in the currentless (de-energised) state of the relay is connected to a normally closed contact 33—and in the energised (excited) state is connected to a normally open contact 34. The switchover of the switchover device is preferably performed in the currentless state. For example, the control device 29 by means of the resistance 30 monitors the motor current and switches over the switchover device 31 only when the current flowing through it has dropped below a limit value. This can be the case with sufficient de-energisation of the motor 18. In addition, it can be provided that the control device 29 still switches over the switchover device 31 in spite of current being present, if otherwise the maximum closing time would be exceeded.

The winding 26 is connected by one end 35 to the contact tongue and by said contact tongue to the inverter bridge. By its other end 36 the winding 26 is directly connected to the inverter bridge. The end 36 is additionally connected to a capacitive damping circuit 37, the other end of which rests against the normally closed contact 33. The capacitive damping circuit 37 contains at least one capacitor 38 and possibly further components, such as capacitors, resistors or inductive elements connected in parallel or in series, and possibly also non-linear components, such as diodes or Z-diodes.

The capacitive damping circuit 37 is connected in parallel to the winding 26 when the switchover relay (switchover device 31) is de-excited, such that a resonance arrangement LCR formed from the inductance L of the winding 26, the capacitance of the capacitor 38, and the internal resistance R of the winding 26 is formed. The possibly frequency-dependent internal resistance R can also additionally represent the iron losses of the motor and other losses. The resonance arrangement LCR preferably has a high quality Q for example of more than 20, since the resonance frequency is defined more clearly with rising quality:

$$Q = \frac{1}{R}\sqrt{\frac{L}{C}}$$

The resistance R lies preferably in the region of a few ohms, for example 4 to 8Ω, the inductance L lies preferably in the region of a few mH, for example 10 to 20 mH, and the capacitance C lies preferably in the range of a few hundred nF, for example 330 nF.

The valve actuator 10, to the extent described, works on the valve 11 as follows:

It is firstly assumed that the valve 11 is to be opened. To this end, the control circuitry 29 is prompted to activate the connected inverter so as to supply current pulses to the windings 25, 26 via the switchover device 31, which current pulses rotate the rotor 27 in the desired direction until the desired position of the valve closure member 16 is reached after a predefined number of steps. In this state the windings 25, 26 can continue to be energised in this way, such that a magnetic field that is no longer rotating is maintained in the stepper motor 18, so as to hold the rotor 27 in the predefined position.

The controlled adjustment or also closing of the valve 11 is normally performed likewise by means of the control circuitry under controlled energisation of the windings 25, 26 by appropriate activation of the inverter bridges. A magnetic field rotating backwards is created, which can then rotate the rotor 27 backwards and possibly also back into other positions to a standstill. The closing spring 17 with these actions always has the function of holding taut the chain 22 or another tension means, such as a cable, a belt or the like, and preloading it in the direction of closure of the valve 11. It does not cause the closure, however. This is to be distinguished from the currentless state with closed valve and fast closing so as to transfer the valve 11 in the event of currentless actuator 10 in a controlled manner into the closed position. The latter is performed as follows:

In the currentless state the energy available to the control circuitry 29 is no longer sufficient to maintain controlled motor operation. A fast-closing pulse can be triggered by switching off the supply voltage of the valve actuator 10. In this case, the switchover relay drops out, i.e. the switchover device 31 produces a connection between the tongue 32 and the normally closed contact 33. Here, the control circuitry 29 can still be in operation, such that it prompts the disconnection of the switchover relay. Alternatively, the drop-out, i.e. de-energisation of the switchover valve can also be implemented simply by the omission of the operating voltage. The switchover device 31 is preferably controlled such that a switchover into the currentless state occurs and therefore the contacts of the switchover device are looked after. In this way, the capacitive damping circuit 37 is in any case connected to the winding 26. At the same time, other damping circuits are connected to the other windings.

Figure 4:
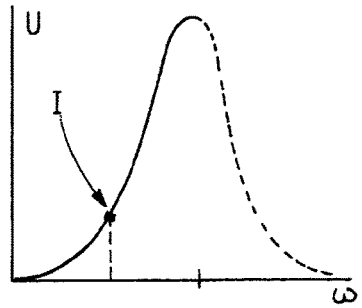
FIG. 4 shows a graph illustrating the resonance characteristic of the damping circuitry.
Figure 5:
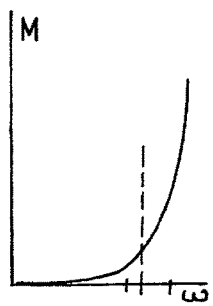
FIG. 5 shows the deceleration torque produced by the resonance circuitry in the form of the graph.

The closing spring 17 now forces the valve closure member 16 into the closed position and in so doing drives the stepper motor 18 via the gearing 19. This motor runs at increasing speed and in so doing generates a voltage in the windings 25, 26. In the resonance circuit LCR an oscillating current is produced. This process extends over the entire closing path of the valve 11. The circuit frequency co of this oscillation lies here preferably below the resonance frequency of the resonance circuit LCR, the resonance characteristic curve of which is shown in FIG. 4. The working point I lies on the left, low-frequency branch of the resonance characteristic curve. A current acting in a decelerating manner is created accordingly, which according to the graph in FIG. 5 causes a deceleration torque M.

The correlation between the generator voltage U and the (circuit) frequency co is heavily non-linear at the working point I in accordance with FIG. 4. This results in an even heavier non-linear deceleration torque curve according to FIG. 5. As can be seen, the deceleration torque increases or decreases overproportionally with small changes to the speed, which results in correspondingly small changes to the circuit frequency co of the generator voltage generated by the stepper motor 18. This has a very significantly speed-stabilising effect on various forces acting on the valve closure member 16.

Figure 3:
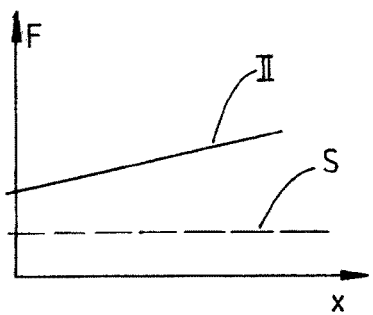
FIG. 3 shows a spring characteristic curve of the closing spring of the valve according to FIG. 1.

In this way it can be ensured that the stepper motor 18 runs quickly enough to close the valve 11 within a maximum time and on the other hand not too quickly to limit the kinetic energy present in the system. Here, this process is hardly dependent on the spring characteristic curve II shown in FIG. 3. This can be steep or flat. In any case, however, it does not run through the zero point, and therefore a closing force is still present even if the valve closure member 16 is sitting on the valve seat 15.

The operating regime of the valve 11 and its actuator 10 can also be limited to a simple opening and closing. To this end the motor 18 when the actuator 10 is energised can be moved into the open position and held there. For disconnection, i.e. closure of the valve, the energisation is interrupted. The valve is then closed in that the motor 18, driven by the closing spring 17, runs in the closed position in generator operation with speed control by the resonance arrangement LCR.

The valve actuator 10 according to the invention has a damping circuitry with capacitive damping circuit 37, which is activated with generator operation of the stepper motor 18. The damping circuitry together with the motor winding 26 forms a resonance arrangement LCR, which acts in a speed-stabilising and -regulating manner. The speed of the stepper motor 18 running in generator operation is kept constant within limits, more specifically without control intervention of a control circuitry. The damping circuitry is thus also operable in the currentless state of the controller and is reliable regardless of the external power supply. Fast closing is achieved and excessive post-running of the motor 18 is also reliably prevented. On the one hand the maximum closing time can be reliably undershot, and on the other hand the post-running path is limited by a stop, and the contact energy at the stop is reliably limited to a permissible extent.

REFERENCE SIGNS

| | |
|---|---|
| 10 | valve actuator |
| 11 | valve |
| 12 | input |
| 13 | output |
| 14 | valve housing |
| 15 | valve seat |
| 16 | valve closure member |
| 17 | closing spring |
| 18 | stepper motor |
| 19 | gearing |
| 20 | motor pinion |
| 21 | gearwheel |
| 22 | chain |
| 23 | chain wheel |
| 24, 24a | operating circuitry |
| 25, 26 | windings |
| 27 | rotor |
| 28 | feed circuitry |
| 29 | control circuitry |
| 30 | current sensor circuitry |
| 31 | switchover device |
| 32 | tongue |
| 33 | normally closed contact |
| 34 | normally open contact |
| 35, 36 | winding ends of the winding 26 |
| 37, 37a | damping circuitry, capacitive damping circuit |
| 38 | capacitor |
| C | capacitance |
| L | inductance of the winding 26 |
| R | loss resistance, internal resistance of the winding 26 |
| LCR | resonance circuit |
| I | working point |
| U | generator voltage at winding 26 |
| ω | circuit frequency |
| F | force |
| x | path |
| M | deceleration torque |
| II | spring characteristic curve |
| S | sum of the forces in the valve actuator 10 acting in an inhibiting manner |

The invention claimed is:

1. A valve actuator (10) comprising:
    a stepper motor (18), which comprises at least two windings (25, 26), which have an inductance (L) and an ohmic resistance (R), and a rotor associated with a permanent magnet,
    a gearing (19), via which the stepper motor (18) can be connected in terms of drive to a valve closure member (16) of a valve (11) to move the valve closure member (16) away from a valve seat (15) in an opening direction and towards the valve seat (15) in a closing direction,
    a spring (17), which is connected to the valve closure member (16) to preload the valve closure member (16) in the closing direction,
    a feed circuitry (28), which is connectable to at least one of the at least two windings (25, 26) to energise the at least one of the at least two windings (25, 26) to drive the stepper motor (18),
    at least one damping circuitry (37) comprising a capacitor (C), which together with one of the at least two windings (26) forms a resonance circuit (LCR) configured such that an oscillating current or voltage is produced during an entire closing path of the valve (11), wherein the oscillating current or voltage has an oscillating frequency below a resonance frequency of the resonance circuit, and
    at least one switchover device (31), which is connected to connect one of the at least two windings (25, 26) to either to the feed circuitry (28) or the damping circuitry (37).

2. The valve actuator according to claim 1, further comprising:
    a second damping circuitry (37a) with a capacitive damping circuit, and
    a second switchover device are provided,
    wherein the second switchover device is configured to connect one of the at least two windings (25, 26) not connected to the at least one switchover device either to the feed circuitry (28) or the second damping circuitry (37a).

3. The valve actuator according to claim 2, wherein the switchover device (31) and the second switchover device are controlled in a synchronously switching manner.

4. The valve actuator according to claim 1, wherein the switchover device (31) is a switchover relay with mechanical contact.

5. The valve actuator according to claim 1, wherein the resonance circuit (LCR) has a quality factor (Q) that is greater than five.

6. The valve actuator according to claim 1, wherein the spring (17) has a spring characteristic curve which, in accordance with a force (F) applied by the spring (17), is greater at any point of a path (x) of the valve closure member (16) than a sum of forces of the valve actuator (10) acting in an inhibiting manner.

7. The valve actuator according to claim 1, wherein the spring (17) has a spring characteristic curve which, in accordance with a force (F) applied by the spring (17), is smaller at any point of a path of the valve closure member (16) than a maximum deceleration effect M that can be applied by the damping circuitry (37) at a resonance point.

8. The valve actuator according to claim 1, wherein the spring (17) has a force-path characteristic curve with positive gradient.

9. The valve actuator according to claim 1, wherein the damping circuitry (37) has a progressively rising deceleration torque-speed characteristic curve.

10. The valve actuator according to claim 1, wherein the damping device (37) and the spring (17) are dimensioned and coordinated with one another in such a way that motor speed (ω) during closing the valve (11) is five to fifteen times motor speed when opening the valve (11).

11. The valve actuator according to claim 1, wherein the gearing (19) comprises a gearless unit, whereby post-running is made possible, during which kinetic energy remaining in the actuator once the valve closure member has been placed in position can be eliminated.

12. The valve actuator according to claim 1, wherein the gearing comprises a flexible tension means connected to move the valve closure member (16).

13. A method for operating a valve actuator comprising a stepper motor (18), which comprises at least two windings (25, 26), which have an inductance (L) and an ohmic resistance (R), and a rotor associated with a permanent magnet, a gearing (19), via which the stepper motor (18) can be connected in terms of drive to a valve closure member (16) of a valve (11) to move the valve closure member (16) away from a valve seat (15) in an opening direction and towards the valve seat (15) in a closing direction, a spring (17), which is connected to the valve closure member (16) to preload the valve closure member (16) in the closing direction, a feed circuitry (28), which is connectable to at least one of the at least two windings (25, 26) to energise the at least one of the at least two windings (25, 26) to drive the stepper motor (18), at least one damping circuitry (37) with a capacitive damping circuit (38), and at least one switchover device (31), which is connected to connect one of the at least two windings (25, 26) to either to the feed circuitry (28) or the damping circuitry (37), the method comprising:

energising the stepper motor (18) with current via the switchover device (31) to open the valve (11), energising the stepper motor (31) with holding current via the switchover device (31) to hold the valve (11), energising the stepper motor (18) with current via the switchover device (31) to close the valve (11) in a first manner, and connecting the stepper motor (18), with closing of the valve (11) in a second manner, to the damping circuitry (37) via the switchover device (31) and operating the stepper motor (18) in generator operation, wherein the damping circuitry (37) comprises a capacitor (C), which together with one of the at least two windings (26) forms a resonance circuit (LCR), and wherein the operating the stepper motor (18) in a generator operation comprises producing an oscillating current or voltage during an entire closing path of the valve (11), wherein the oscillating current or voltage has an oscillating frequency below a resonance frequency of the resonance circuit.

14. The method according to claim 13 further comprising controlling the switchover device (31) such that the one of the at least two winding (26) is de-energised during switchover.

* * * * *